(12) United States Patent
Mo et al.

(10) Patent No.: US 9,311,125 B2
(45) Date of Patent: Apr. 12, 2016

(54) APPARATUS AND METHOD OF SUPPORTING PLURALITY OF OPERATING SYSTEMS

(75) Inventors: Sang-dok Mo, Hwaseong-si (KR); Sung-min Lee, Suwon-si (KR); Sang-bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 712 days.

(21) Appl. No.: 12/469,945

(22) Filed: May 21, 2009

(65) Prior Publication Data

US 2010/0037243 A1      Feb. 11, 2010

(30) Foreign Application Priority Data

Aug. 6, 2008  (KR) .................. 10-2008-0077125

(51) Int. Cl.
  *G06F 9/455*    (2006.01)

(52) U.S. Cl.
  CPC ............ *G06F 9/45558* (2013.01); *G06F 9/455* (2013.01); *G06F 9/45533* (2013.01); *G06F 9/45537* (2013.01); *G06F 9/45545* (2013.01); *G06F 2009/45566* (2013.01); *G06F 2009/45587* (2013.01)

(58) Field of Classification Search
  USPC .......................................................... 718/1
  See application file for complete search history.

(56) References Cited

U.S. PATENT DOCUMENTS

| | | | |
|---|---|---|---|
| 5,767,849 A | 6/1998 | Borgendale et al. | |
| 6,496,847 B1 * | 12/2002 | Bugnion et al. | 718/1 |
| 8,274,518 B2 | 9/2012 | Blythe | |
| 2003/0033443 A1 | 2/2003 | Igotti | |
| 2004/0010788 A1 * | 1/2004 | Cota-Robles et al. | 718/1 |
| 2005/0132367 A1 * | 6/2005 | Tewari et al. | 718/1 |
| 2005/0198196 A1 * | 9/2005 | Bohn et al. | 709/217 |
| 2006/0010433 A1 * | 1/2006 | Neil | 717/138 |
| 2006/0136911 A1 * | 6/2006 | Robinson et al. | 718/1 |
| 2006/0136912 A1 * | 6/2006 | Robinson et al. | 718/1 |
| 2006/0143617 A1 * | 6/2006 | Knauerhase et al. | 718/104 |
| 2006/0265711 A1 * | 11/2006 | Bantz et al. | 718/1 |
| 2007/0022389 A1 | 1/2007 | Ording et al. | |
| 2007/0028238 A1 * | 2/2007 | Bennett et al. | 718/1 |
| 2007/0083862 A1 * | 4/2007 | Wooldridge et al. | 718/1 |
| 2007/0169024 A1 * | 7/2007 | Drepper | 717/139 |

(Continued)

FOREIGN PATENT DOCUMENTS

| | | |
|---|---|---|
| EP | 1677190 | 7/2006 |
| JP | 2006-309754 | 11/2006 |

(Continued)

OTHER PUBLICATIONS

Korean Office Action issued Jul. 31, 2014 in counterpart Korean Patent Application No. 10-2008-0077125 (6 pages, in Korean with English Translation).

*Primary Examiner* — Charles Swift
(74) *Attorney, Agent, or Firm* — NSIP Law

(57) ABSTRACT

An apparatus is provided for supporting a plurality of operating systems by single hardware, wherein the plurality of operating systems include a server operating system to provide an integrated user interfaces for applications running on the plurality of operating systems, and at least one client operating system to provide a user interface for applications running on the client operating system through the server operating system under the control of the server operating system.

22 Claims, 10 Drawing Sheets

(56) References Cited

U.S. PATENT DOCUMENTS

| | | | |
|---|---|---|---|
| 2007/0300220 A1* | 12/2007 | Seliger et al. | 718/1 |
| 2009/0113424 A1* | 4/2009 | Chen et al. | 718/1 |
| 2009/0125902 A1* | 5/2009 | Ghosh et al. | 718/1 |
| 2009/0313620 A1* | 12/2009 | Sedukhin et al. | 718/1 |
| 2009/0328033 A1* | 12/2009 | Kohavi et al. | 718/1 |
| 2010/0138744 A1* | 6/2010 | Kamay et al. | 715/716 |

FOREIGN PATENT DOCUMENTS

| | | |
|---|---|---|
| KR | 10-2000-0071251 | 11/2000 |
| KR | 10-2003-0034037 | 5/2003 |
| KR | 10-2005-0114944 | 12/2005 |
| KR | 10-2006-0079088 A | 7/2006 |
| KR | 10-2006-0112714 A | 11/2006 |

\* cited by examiner

APPARATUS AND METHOD OF SUPPORTING PLURALITY OF OPERATING SYSTEMS

CROSS REFERENCE TO RELATED APPLICATION(S)

This application claims the benefit under 35 U.S.C. §119(a) of a Korean Patent Application No. 10-2008-0077125, filed Aug. 6, 2008, the disclosure of which is incorporated herein in its entirety by reference.

BACKGROUND

1. Field

The following description relates to an apparatus and method of supporting a plurality of operating systems.

2. Description of the Related Art

With the increase in use of personal portable devices and Internet access, it becomes much easier to share a variety of information and freely use new types of software. Free access to new information and software expands a user's freedom of choice, but at the same time, may threaten the availability and safety of mobile devices.

Such free sharing of significant amounts of information and free use of software may lead to unexpected distribution of malicious software, which can cause devices to malfunction and leakage of private information of a user. To overcome such drawbacks, a virtualization technology has been introduced mainly focusing on the virtual machine monitor.

SUMMARY

In one general aspect, an apparatus for supporting a plurality of operating systems by single hardware, wherein the plurality of operating systems includes a server operating system to provide an integrated user interface for applications running on the plurality of operating systems, and at least one client operating system to provide a user interface for applications running on the client operating system through the server operating system under the control of the server operating system.

The server operating system may provide an integrated graphic user interface for the applications running on the server operating system and the at least one client operating system.

The server operating system may provide icons representing individual applications in a window as a unified graphic user interface.

Where applications are present in a plurality of domains, the server operating system may provide information indicating the domain in which each respective application is present, along with a corresponding application icon.

The server operating system may include an application configuration manager to store and manage information of applications running on the plurality of operating systems, an application registration manager to install the applications, an application runtime manager to control execution of the applications, and a human interface device (HID) manager to control a user interface device, and the client operating system may include an application registration manager proxy to install applications on the client operating system under the control of the application registration manager of the server operating system, an application runtime manager proxy to control execution of applications on the client operating system under the control of the application runtime manager of the server operating system, and an HID manager proxy to relay applications on the HID manager and the client operating system by communicating with the HID manager.

Where a user input signal to request installation of an application is received, the application registration manager of the server operating system may select an operating system in which the application is to be installed, install the application in the selected operating system, and register information including an installation path of the application in the application configuration manager.

The application registration manager may install an application which is authenticated in a specific operating system among the plurality of operating systems.

Where a user input signal to request running an application is received and the requested application is to be run on the client operating system, the application runtime manager of the server operating system may request the application runtime manager proxy to run the requested application, receive the result of running the application from the application runtime manager proxy, and provide the result to the user.

Where a user input signal to request change of a foreground application from a current running application to another application is received, the server operating system may provide the user with a list of applications currently running on the server operating system and the client operating system and may provide the user with the requested application to be executed as the foreground application.

Where a user input signal to request termination of an application is received and the requested application is running on the server operating system, the application runtime manager may terminate the execution of the application, and where the requested application is running on the client operating system, the application runtime manager may request an application runtime manager proxy of a domain to which the requested application belongs to terminate the application and the application runtime manager may update a list of currently running applications when the application is terminated.

The HID manager may set an application to output sound among applications running on the server operating system and the at least one client operating system.

The server operating system may provide an integrated user interface for applications running on the plurality of operating systems based on an inter-domain communication.

In another general aspect, a method of supporting a plurality of operating systems by single hardware includes providing an integrated user interface in a server operating system for applications to be executed in a plurality of operating systems and providing a user interface in at least one client operating system for applications present in the at least one client operating system through the server operating system under the control of the server operating system.

The providing of the integrated user interface in the server operating system may include providing an integrated graphic user interface for applications to be executed on the server operating system and the at least one client operating system.

The providing of the integrated graphic user interface may include providing icons representing the respective applications in one window as the integrated graphic user interface.

The method may further include receiving by an application registration manager a user input signal to request installation of an application, selecting by the application registration manager an operating system in which the application is installed by the server operating system, installing by the application registration manager the application in the selected operating system, and registering by the application registration manager information including an installation path of the application.

The method may further include receiving by an application runtime manager a user input signal to request running of an application, determining by an application configuration manager the requested application is to run on the client operating system, requesting by the application runtime manager the client operating system to run the requested application; and receiving by the application runtime manager a result of running the application from the client operating system and providing the result to the user.

The method also may further include receiving by a main application a user input signal to request changing of a current foreground application to another application, providing by the server operating system a list of applications currently running on the server operating system and the client operating system, and providing a user with an application requested to be run from the list as the foreground application.

Where a user input signal to request termination of an application is received, there may be at least one of terminating the application by the server operating system when the requested application is running on the server operating system, and requesting by the server operating system the client operating system to terminate the application when the requested application is running on the client operating system may occur.

In yet another general aspect, a computer-readable storage medium storing a program configured to cause an apparatus for supporting a plurality of operating systems by single hardware to provide an integrated user interface in a server operating system for applications to be executed in a plurality of operating systems, and provide a user interface in at least one client operating system for applications present in the at least one client operating system through the server operating system under the control of the server operating system.

Other features and aspects will be apparent from the following description, drawings, and claims.

Figure 1:
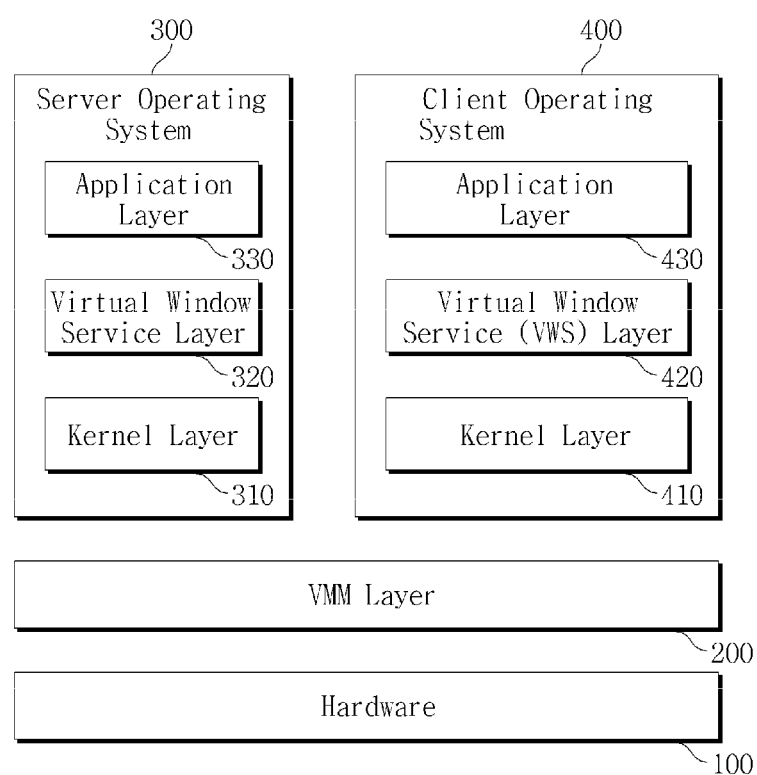
FIG. 1 is a diagram illustrating system architecture of an exemplary apparatus supporting a plurality of operating systems.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, methods, apparatuses, and systems described herein. Accordingly, various changes, modifications, and equivalents of the media, methods, apparatuses, and systems described herein will be suggested to those of ordinary skill in the art. Also, descriptions of well-known functions and structures may be omitted for increased clarity and conciseness.

FIG. 1 illustrates an exemplary apparatus supporting a plurality of operating systems 300 and 400. The apparatus supporting a plurality of operating systems 300 and 400 allows hardware 100 to support a plurality of operation executing environments, and may be an apparatus based on a virtual machine monitor (VMM) layer 200. The VMM layer 200 is a communication channel which may be safer to use than a network established between several domains operated on a VMM, and may provide an inter-domain communication (IDC) channel. The VMM layer 200 may include software such as VMM, a hypervisor, L4, and the like.

Although the plurality of operating systems 300 and 400 use single hardware 100, the operating systems 300 and 400 operate as if driven on different pieces of hardware. The number of operating systems (or domains) to be driven on a system is restricted only by hardware resources. For clarification, the plurality of operating systems 300 and 400 of FIG. 1 are illustrated to include a server operating system (virtual window service server) 300 and a client operating system (virtual window service client) 400, and may at a minimum, include one or more client operating systems; there is no limit in the number of the client operating systems.

A domain indicates an environment in which an operating system is driven. A domain application refers to an application that is present and running on a predetermined operating system or a domain where a predetermined operating system is driven. For example, a first domain application may indicate a first operating system or an existing application that is driven on a first operating system.

From among the plurality of operating systems 300 and 400, there may be only one operating system that acts as the server operating system 300, and the server operating system directly controls human interface device (HID) hardware. The HID hardware is a user interface for direct interaction with a human by receiving an input from and providing an output to the human. Examples of general HID hardware may include a keyboard, a mouse, a trackball, a touch pad, a graphic tablet, a joystick, etc. The client operating systems including the virtual window service client 400 are connected with the server operating system 300 over a network or an inter-domain communication (IDC), and issue a request for use of HID.

The server operating system 300 provides an integrated user interface for applications to run on a plurality of operating systems. Under the control of the server operating system 300, the client operating system 400 may provide a user interface for the applications existing on the client operating system 400 through the server operating system 300. The server operating system 300 may provide an integrated graphic user interface for applications which are running on the server operating system 300 itself and at least one client operating system. Moreover, the server operating system 300 may display icons indicating respective applications on a window as integrated graphic user interfaces.

Each of the operating systems 300 and 400 includes a kernel layer 310 and 410 for communication with other operating systems, a virtual window service (VWS) layer 320 and 420 for providing an integrated user interface for a plurality of operating systems, and an application layer 330 and 430.

The apparatus for supporting the plurality of operating systems 300 and 400 may be implemented as a mobile phone, a mobile Internet device (MID), a digital television (DTV), a personal digital assistant (PDA), an ultra mobile PC (UMPC), and any other terminal device, and its type or form is not limited thereto.

Hereinafter, further detail of the server operating system 300 and the client operating system 400 will be described with reference to FIGS. 2 and 3.

Figure 2:
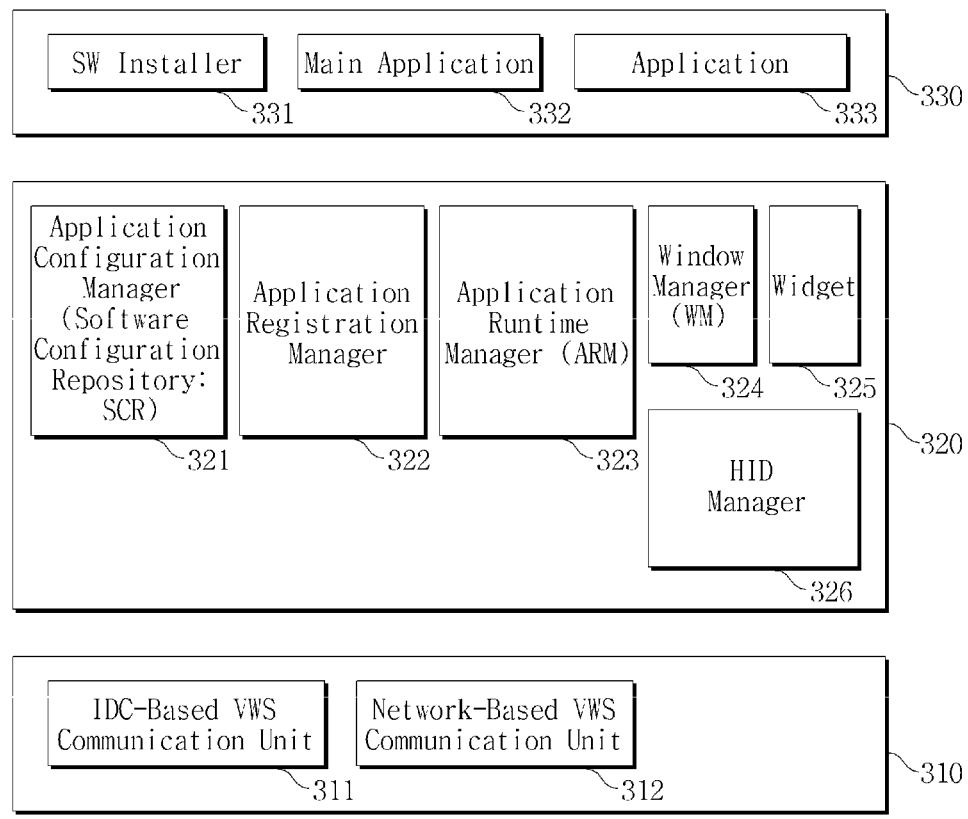
FIG. 2 is a diagram illustrating an exemplary server operating system.

FIG. 2 illustrates an exemplary server operating system 300. The kernel layer 310 of the server operating system 300 may include an inter domain communication-based (IDC-based) VWS communication unit 311 and a network-based VWS communication unit 312.

The IDC-based VWS communication unit 311 is a component that communicates with other domains over a communication channel provided by the virtual machine monitor (VMM). Such communication method can resolve security problems that may occur in communications over a network.

The network-based VWS communication unit 312 is a component that communicates with other domains using a general network protocol such as TCP/IP. A network-based communication is easy to implement but does not communicate with any domain not connected to the network, and may have security problems.

The VWS layer 320 of the server operating system 300 may include an application configuration manager (e.g., software configuration repository (SCR)) 321, an application registration manager 322, an application runtime manager (ARM) 323, a window manager 324, a widget 325, and a human interface device (HID) manager 326.

The SCR 321 stores and manages various types of information related to application configuration, that is, meta information of the application. For example, the application configuration manager 321 may store and manage a path to an executable file for each application, a path to an icon, and information about a domain where the corresponding application exists.

The application registration manager 322 installs a new application (or software), and to this end, the application registration manager 322 unzips an application package, verifies the application, and copies files of the application. Where the application registration manager 322 receives a user input signal that requests installation of an application, the application registration manager 322 may select an operating system to be installed, install the application on the selected operating system, and register application-related information including an installation path of the application in the application configuration manager 321.

There are various methods of determining in which domain the application is to be installed. A domain where the application registration manager 322 is currently operated may be considered as a safe domain where only an authenticated application is installed and operated and the other domain may be considered as a domain where an application may be installed and operated without any restrictions. For example, where the application to be installed is authenticated, the application may be installed in a domain where the application registration manager 322 is operated and where the application to be installed is not authenticated the application may be installed in another domain. Where the application is to be installed in the other domain, an application registration manager proxy 421, as described below with reference to FIG. 3, may be requested for the installation. After the application is installed, information (e.g., paths to the executable file and icon) concerning the installation of the application is stored in the application configuration manager 321.

The application runtime manger 323 controls and manages operation including running and terminating the application. For example, where a user clicks a first icon, the application runtime manager 323 receives a request from a main application for running the application connected with the first icon. Then, the application runtime manager 323 receives information necessary for running the application (e.g., information of a domain where the application is present and a path to an executable file of the application) from the application registration manager 322 and may run the application based on the received information.

Where the application to be run is present in another domain, an application runtime manager proxy 422 of the corresponding domain, as described below, may be requested for running the application.

The VWS layer 320 of the server operating system 300 may include the window manager (WM) 324 and the widget 325 which are used in a general operating system.

The window manager 324 included in the VWS layer 320 manages application windows from a plurality of domains. The window manager 324 is a component that manages the arrangement of run windows of a plurality of applications to be executed.

The widget 325 is a software system that makes graphic user interface (GUI) configuration easy. The widget 325 may be a GUI library that may be used for applications such as GTK+, QT, Motif, etc. to be displayed.

The HID manager 326 controls a user interface device. The HID manager 326 displays a GUI image, reproduces sound by using a frame buffer driver, and transfers an input for a predetermined application to the corresponding application. The HID manager 326 may set an application to output sound where a plurality of applications are run in the server operating system 300 and at least one client operating system 400. For example, the HID manager 326 may control the user interface device to synchronize the sound from an application running in a foreground and output the sound. In another example, the HID manager 326 may control the user interface device to output the sound from a predetermined application (e.g., an MP3 file reproducing application) regardless of the application that is currently run in the foreground.

The application layer 330 includes an application installer (or a software installer) 331, a main application 332, and an application 333.

The application installer 331 installs various types of applications (or software) and primarily manages the interface with a user. The practical interior installation is managed by the application registration manager 322.

The main application 332 displays icons of applications running on several domains (e.g., a first domain and a second domain) on one display and functions like a palmtop environment (PE), GPE palmtop environment, a QT palmtop environment, etc.

The application 333 indicates various applications running on the server operating system 300.

Figure 3:
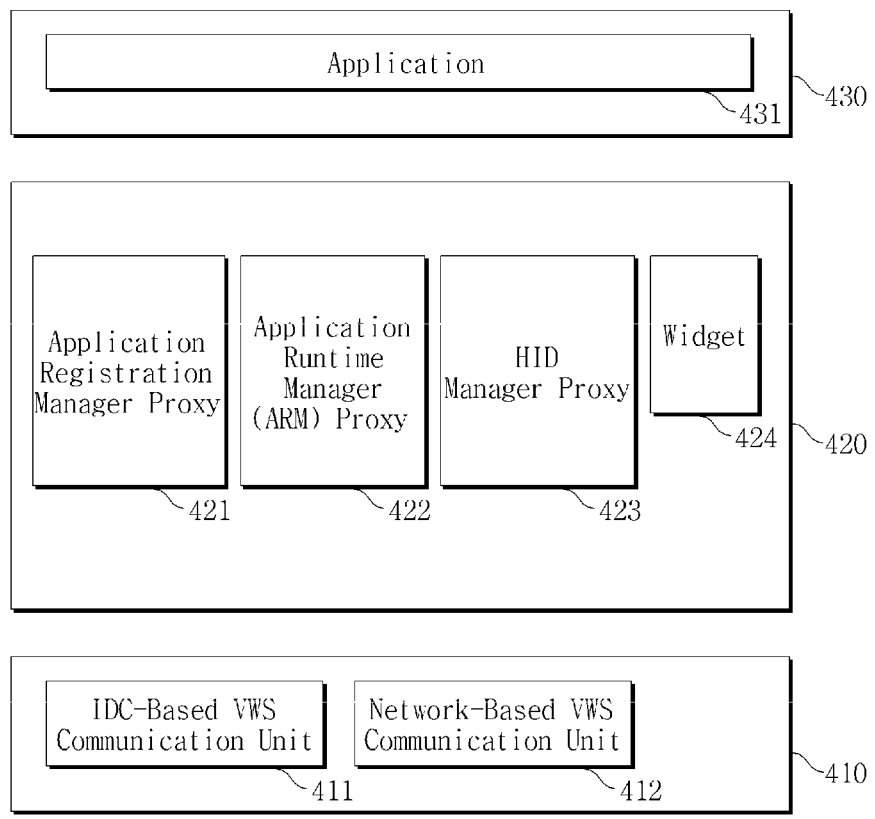
FIG. 3 is a diagram illustrating an exemplary client operating system.

FIG. 3 illustrates an exemplary client operating system 400.

Similar to the server operating system 300 shown in FIG. 2, the client operating system 400 includes a kernel layer 410, a VWS layer 420, and an application layer 430.

The kernel layer 410 may include an IDC-based VWS communication unit 411 and a network-based VWS communication unit 412, like the kernel layer 310 shown in FIG. 2.

The VWS layer 420 may include the application registration manager proxy 421, the application runtime manager proxy (ARM) 422, an HID manager proxy 423, and a widget 424.

The application registration manager proxy 421 installs an application at an appropriate location in response to a request from the application registration manager 322.

The application runtime manager proxy 422 controls and manages operations such as execution and termination of an application, which is present in the same domain as the application runtime manger proxy 422, in response to the request from the application runtime manager 323.

Where the application runtime manager 323 receives a user input signal requesting execution of an application and it is determined that the requested application runs in the client operating system 400, the application runtime manager 323 may request the application runtime manager proxy 422 to run the requested application. The application runtime manager proxy 422 may send an application execution result to the application runtime manager 323 to transfer the result to the user. Then, the application runtime manager proxy 422 may update the currently running application list.

Where the application runtime manager 323 receives a user input signal requesting termination of an application and it is determined that the application is running in the client operating system 400, the application runtime manager 323 may request the application runtime manger proxy 422 to terminate the application.

The HID manager proxy 423 communicates with the HID manager 326 to relay communication between the application that is present in the same domain as the HID manager proxy 423 and the HID manager 326. The HID manager 326 receives relevant information from the HID manager proxy 423 that is present in the same domain where the application is running and displays an image or reproduces sound. The HID manager 326 may transfer a user input, which is to be transferred to an application in a different domain, to the HID manager proxy 423, and the HID manager proxy 423 may forward the user input to the corresponding application.

The HID manager 326 and the HID manager proxy 423 may have X server-client architecture. In this case, the HID manager 326 may include a graphic driver, an input driver, an X server, a sound driver, and a sound backend driver. The HID manager proxy 423 may include an X client and a sound frontend driver. For communication between the HID manager 326 and the HID manager proxy 423, an IDC-cased communication may be employed, as well as the network communication.

In another example, the HID manager 326 and the HID manager proxy 423 may be implemented in a form of spilt driver. In this case, the HID manager 326 may be a component which provides an application with a graphic driver, a graphic backend driver, an input driver, an input backend driver, a sound driver and a sound backend driver, and services available by utilizing these drivers. The HID manager proxy 423 may be a component that provides an application with a graphic frontend driver, an input frontend driver and a sound frontend driver, and services available by utilizing these drivers. Like employing an X-window for communications between the HID manager 326 and the HID manager proxy 423, a network and the IDC may be used together or the IDC may be used.

Figure 4A:
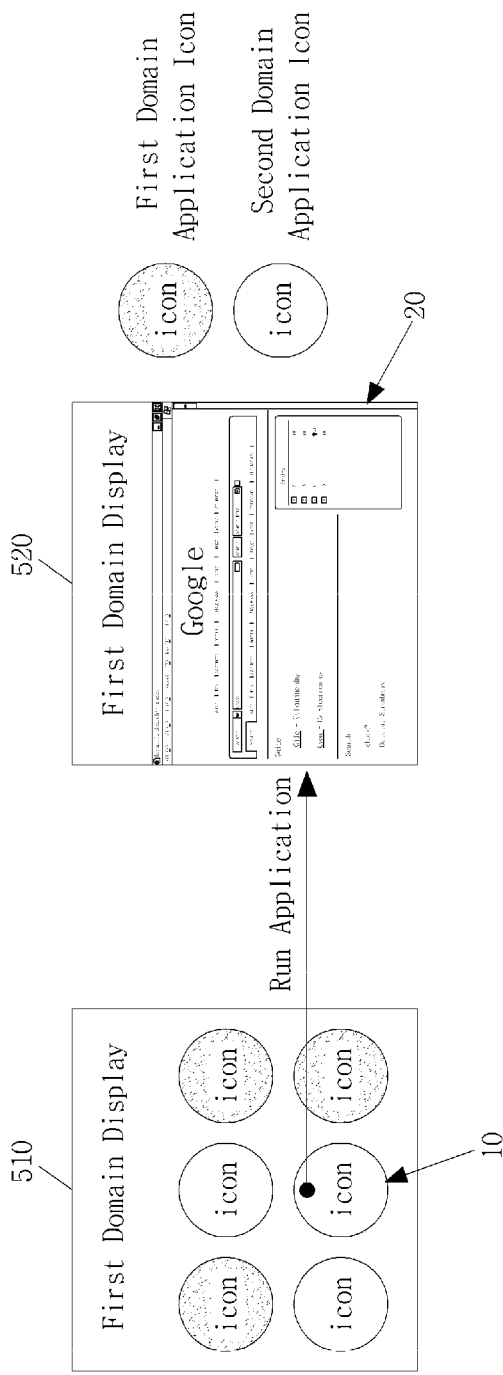
FIG. 4A is a diagram illustrating a plurality of displays provided with an exemplary user interface.
Figure 4B:
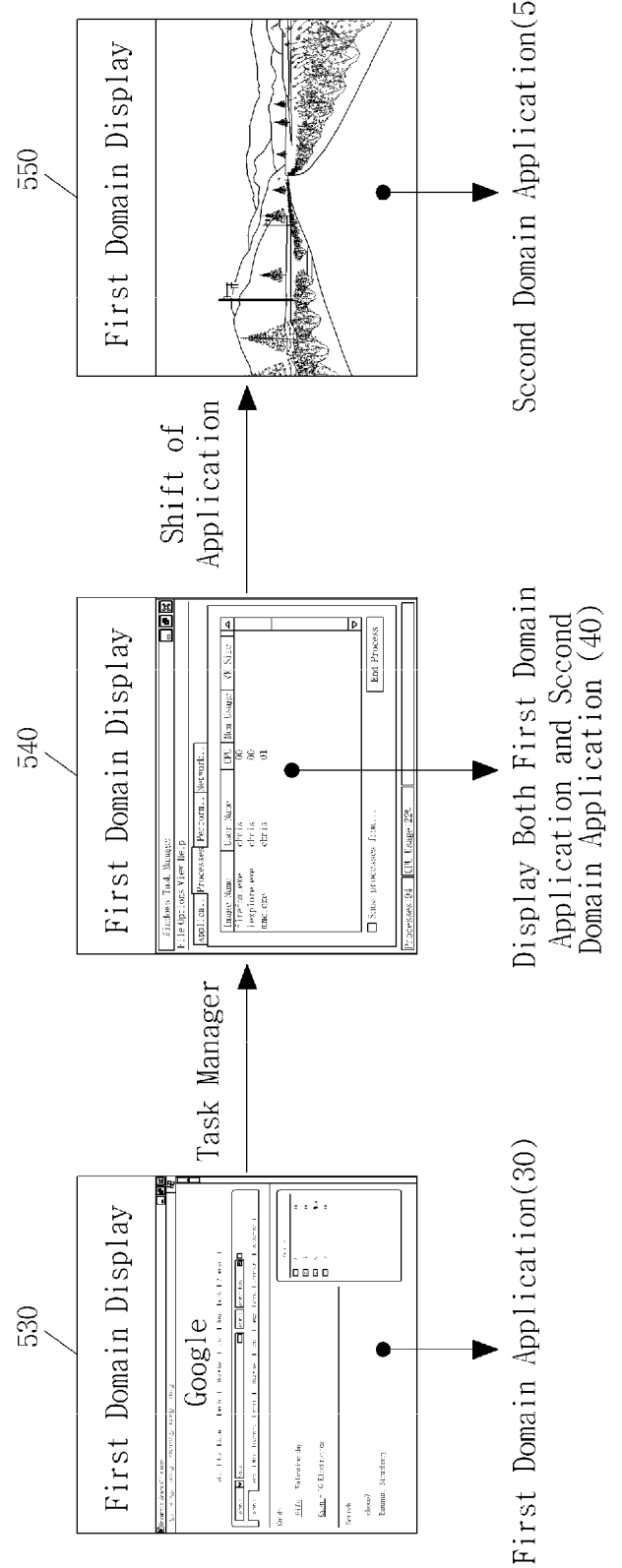
FIG. 4B is a diagram illustrating additional displays provided with the exemplary user interface shown in FIG. 4A.

FIGS. 4A and 4B illustrate displays where exemplary user interface is provided.

FIG. 4A illustrates how to run an application in a different domain. Referring to FIG. 4A, as shown in a display 510, both application icons of a foreground domain and application icons of a background domain may be displayed simultaneously to the user. Also, although not illustrated, where a plurality of applications are present in a plurality of domains, information indicating in which domain each application is present may be displayed along with the application icons.

Although the display 510 shows the application icons only of a first domain and a second domain, icons of executable applications present in each domain may be provided in the display 510 regardless of the number or types of the domains. Where a user selects, for example, an icon 10 for running a predetermined application, an application execution screen 20 may be displayed as shown in a display 520 upon running the application connected with the icon 10.

As described above, the server operating system 300 may provide a coherent user interface through integrated management of the applications running in several domains. Therefore, a user does not need to know which domain an application to be executed is present in, and which domain is currently running as a foreground. That is, when the user runs a predetermined application, the user does not need to take complicated procedures including checking in which domain the predetermined application is present, diverting the domain into a foreground, executing the foreground domain, and then running the predetermined application using an application list in the diverted domain.

FIG. 4B illustrates displays for showing shift from an application currently running on a domain to another application in a different domain. A display 530 shows the current status of an application 30 running on a first domain. In this state, where a user runs a task manager 40 to allow the user to manage applications, as shown in a display 540, the task manager 40 may display applications on both the first domain and a second domain simultaneously. The display 540 may provide a list of all applications running on each domain regardless of the number and the types of the domains, and may provide the domain in which each running application is present. Where a user selects an application of the second domain using the task manager 40 and thereby shifts the application from the application in the first domain to the application 50 in the second domain, a display 550 related to the application 50 may be provided.

As described above, the user does not need to know in which domain a currently running application is present to change the current domain to a foreground. Thus, the user is not required to undertake complicated procedures including checking in which domain the application to be changed to the foreground is present, shifting the domain where the corresponding application is present to a foreground, checking a list of applications currently running in the changed foreground, and executing the corresponding application.

The server operating system 300 may provide an integrated user interface for the applications running on a plurality of operating systems and at least one server operating system 400 may provide user interfaces for its applications through the server operating system 300. Accordingly, the apparatus for supporting a plurality of operating systems may provide a user interface effectively.

Hereinafter, an exemplary method of providing a user interface in an integrated way will be described with reference to FIGS. 5 to 9.

Figure 5:
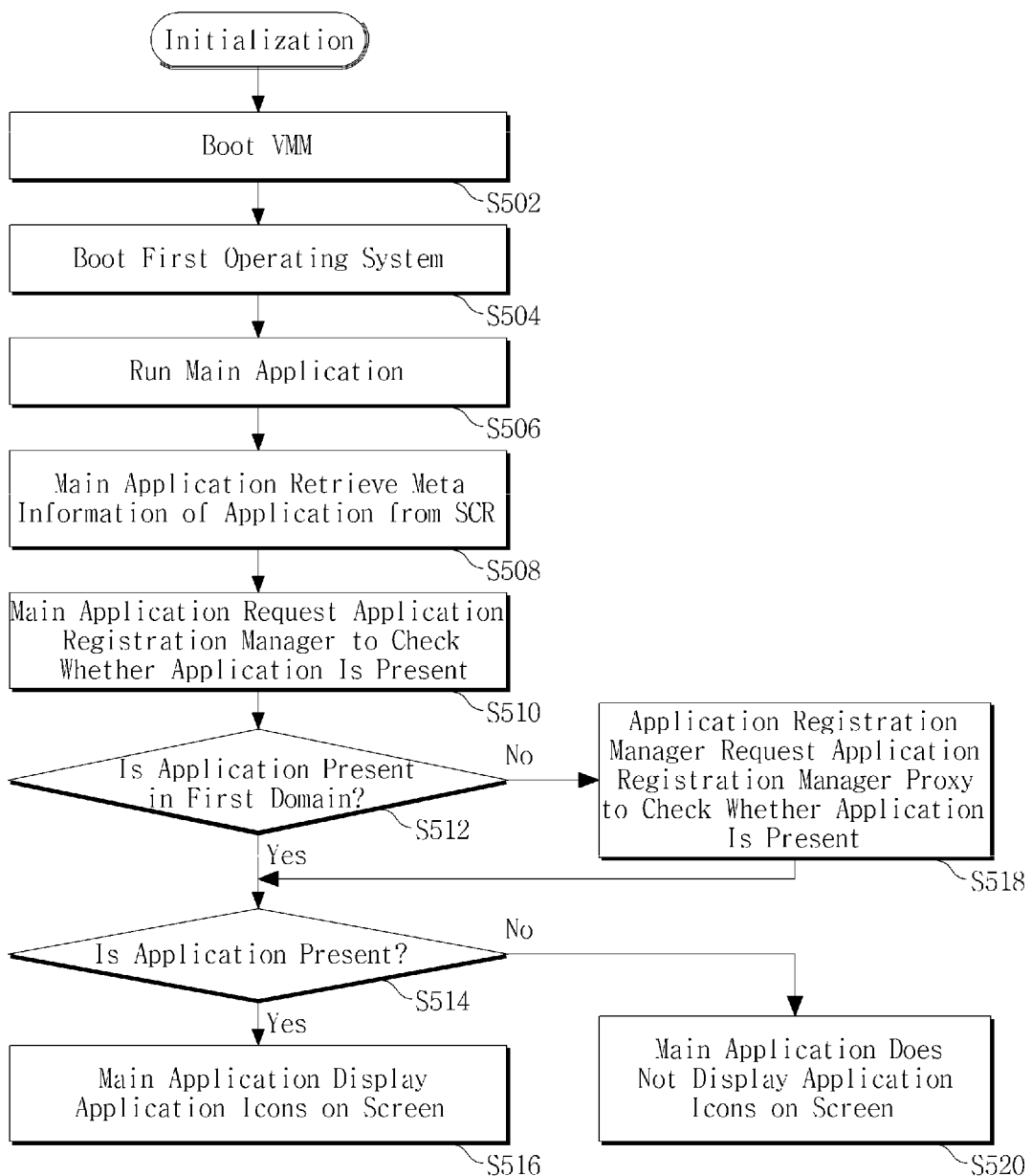
FIG. 5 is a flowchart illustrating an exemplary method of initializing a system in an apparatus for supporting a plurality of operating systems.

FIG. 5 illustrates an exemplary method of initializing a system in an apparatus for supporting a plurality of operating systems.

In the case of a system supporting a virtual window service that supports effectively a plurality of operating systems, where the system is reset, a boot-loader runs a virtual machine monitor (VMM) (operation S502) and the VMM runs each operating system (operation S504). The example shown in FIG. 5 illustrates that only a first operating system is booted as an example, however, other operating systems such as a second boot system, a third boot system, and a fourth boot system may be booted together if necessary.

Once the operating system is complete to boot and initialization of each operating system for the virtual window service is complete, the main application is operated (operation S506).

The main application retrieves application related information from the SCR to display icons of available applications on a screen (operation S508). The main application requests the application registration manager to check if each application included in the retrieved information is executable and practically present (operation S510).

The application registration manager checks whether the requested application belongs to a first domain that is an environment where the server operating system is present (operation S512) and where the application belongs to the first domain, the application registration manager checks whether the application is executable and informs the main application of the result (operation S514). The main application determines whether to display the application in response to receiving the result of checking (operations S516 and S520). For example, where the application belongs to the first domain, the main application displays icons of the available applications on the screen (operation S516) and where the application does not belong to the first domain, the main application does not display the icons of the applications on the screen (operation S520).

Where the application does not belong to the first domain, the application registration manager requests an application registration manager proxy of a domain where a corresponding application is present to check whether the application is practically present in the domain (operation S518) and informs the main application of the result (operation S514). The main application determines whether to display the application in response to the result of checking (operations S516 and S520).

Figure 6:
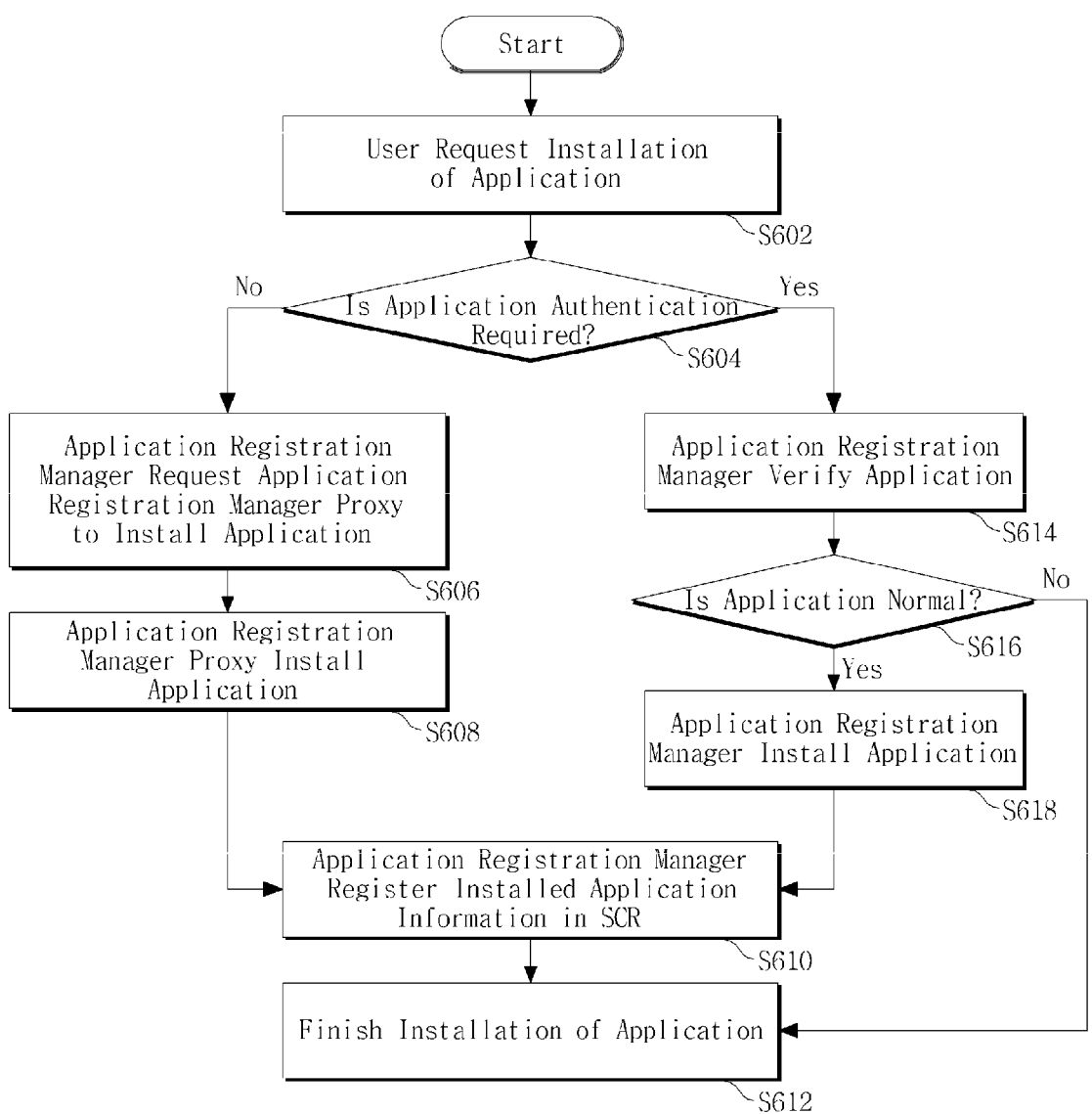
FIG. 6 is a flowchart illustrating an exemplary method of installing a new application in an apparatus for supporting a plurality of operating systems.

FIG. 6 illustrates an exemplary method of installing a new application in an apparatus for supporting a plurality of operating systems. Hereinafter, it is assumed that an authenticated application is installed in a first domain and unauthenticated application is installed in a second domain.

Where a user requests installation of an application (operation S602), the application registration manager receives the user request and checks whether the application to be installed needs to be authenticated (operation S604).

Where the application does not need to be authenticated, the application registration manager requests an application registration manager proxy of the second domain to install the application according to protocol (operation S606) and an application registration manager proxy installs the application in the second domain (operation S608).

Where the application needs to be authenticated, the application registration manager verifies whether the application is a normal application under the protocol (operation S614), and whether the application is normal (operation S616), installs the application (operation S618). To verify whether the application is normal, it may be checked if there is application distortion or if an application designer is authenticated, and other various methods can be used.

Where the installation of the application is complete, the application registration manager records application related information in the application configuration manager (operation S610) and the installation is finished (operation S612). The application related information may be information of a domain in which the application is installed, a path to an executable file, a path to an icon, and application version information.

Figure 7:
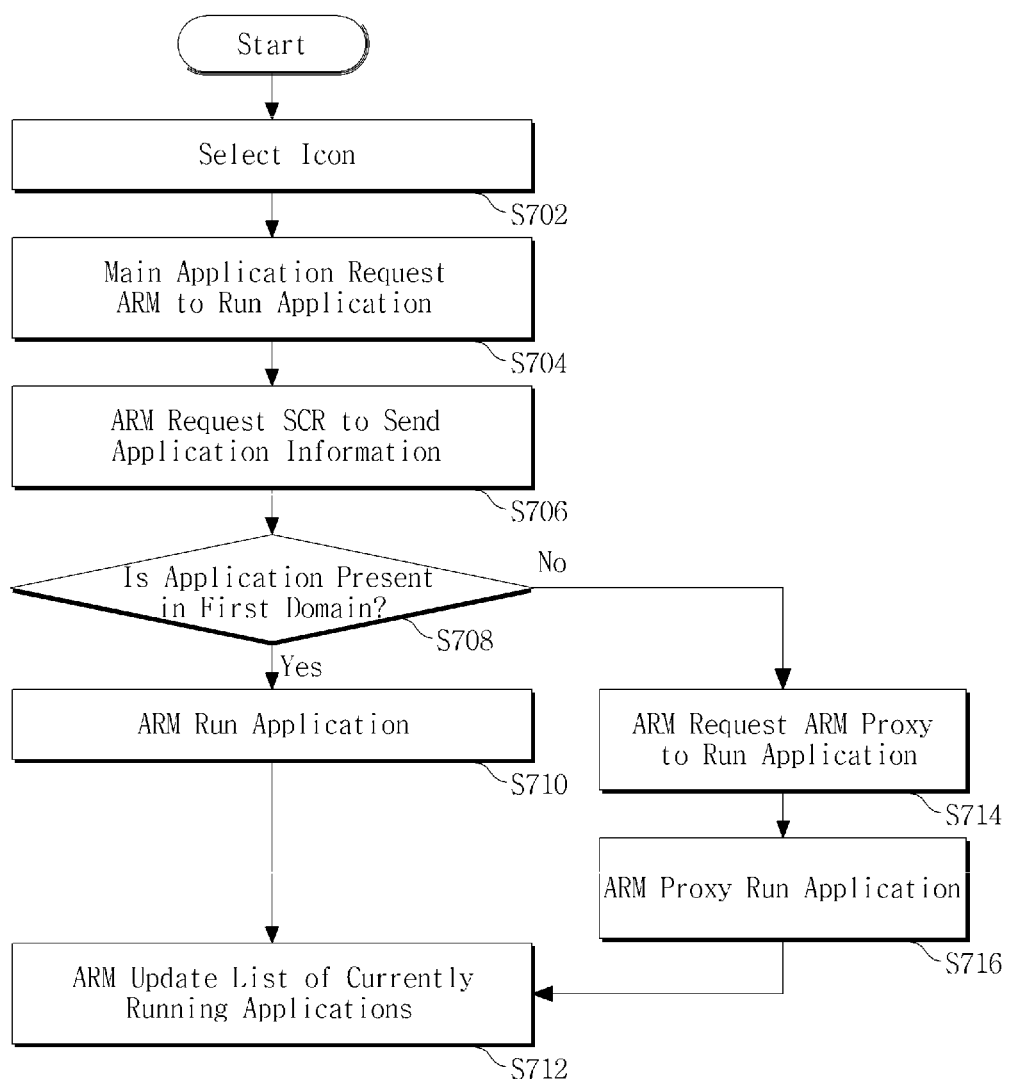
FIG. 7 is a flowchart illustrating an exemplary method of executing an application in an apparatus for supporting a plurality of operating systems.

FIG. 7 illustrates an exemplary method of executing an application in an apparatus for supporting a plurality of operating systems.

Like an application executing method of a typical embedded device, an application may be executed in response to a user's selection of an icon. Where a user selects an icon (operation S702), the main application receives this input and requests an application runtime manager (ARM) to run a corresponding application (operation S704).

The application runtime manager requests an SCR for information of the application (operation S706), and then the application configuration manager verifies the SCR whether the requested application is present in a first domain in which the server operating system is operated (operation S708).

Where the application belongs to the first domain, the application runtime manager runs the application based on the information received from the SCR (operation S710). Then, when the execution of the application is complete, the application runtime manager updates a list of application currently running (operation S712).

Where the application does not belong to the first domain, the application runtime manager requests an application runtime manager proxy of a domain where the application belongs for execution of the application (operation S714), and the requested application runtime manager proxy runs the application using received application information (operation S716). Where the execution of the application is complete, the application runtime manager updates a list of applications currently running.

Figure 8:
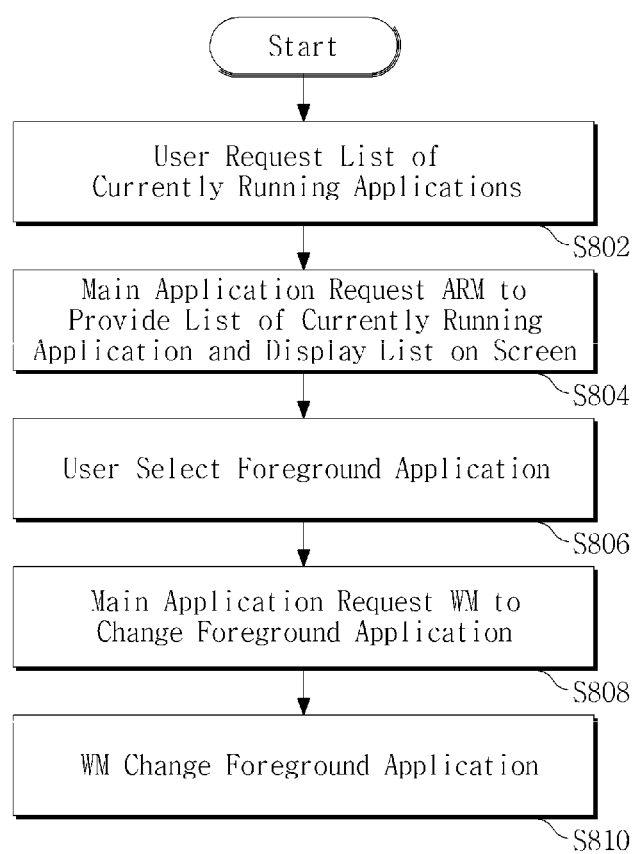
FIG. 8 is a flowchart illustrating an exemplary method of shift of a foreground application in an apparatus for supporting a plurality of operating systems.

FIG. 8 illustrates an exemplary method of shift of a foreground application in an apparatus for supporting a plurality.

Where a user wants to shift a foreground application, for example, from an application A, which is currently used, to an application B, and requests the apparatus to shift the foreground application, the server operating system provides the user with a list of applications running on the server operating system and the client operating system upon receiving the user input request. In addition, the server operating system may provide the user with an application requested to run as the foreground application.

For example, where the user requests the main application for the list of applications currently running (operation S802), the main application requests the application runtime manager for the list and displays the received list received on a screen (operation S804). The user selects an application that the user wants to have as the foreground application from the displayed application list (operation S806).

The main application requests a window manager to change the current foreground application to the selected application (operation S808) and the window manager changes the foreground in response to the request of the main application (operation S810). At this time, a system tool such as the Microsoft window task manager may display the list of applications currently running and request the window manager to change the foreground application.

Figure 9:
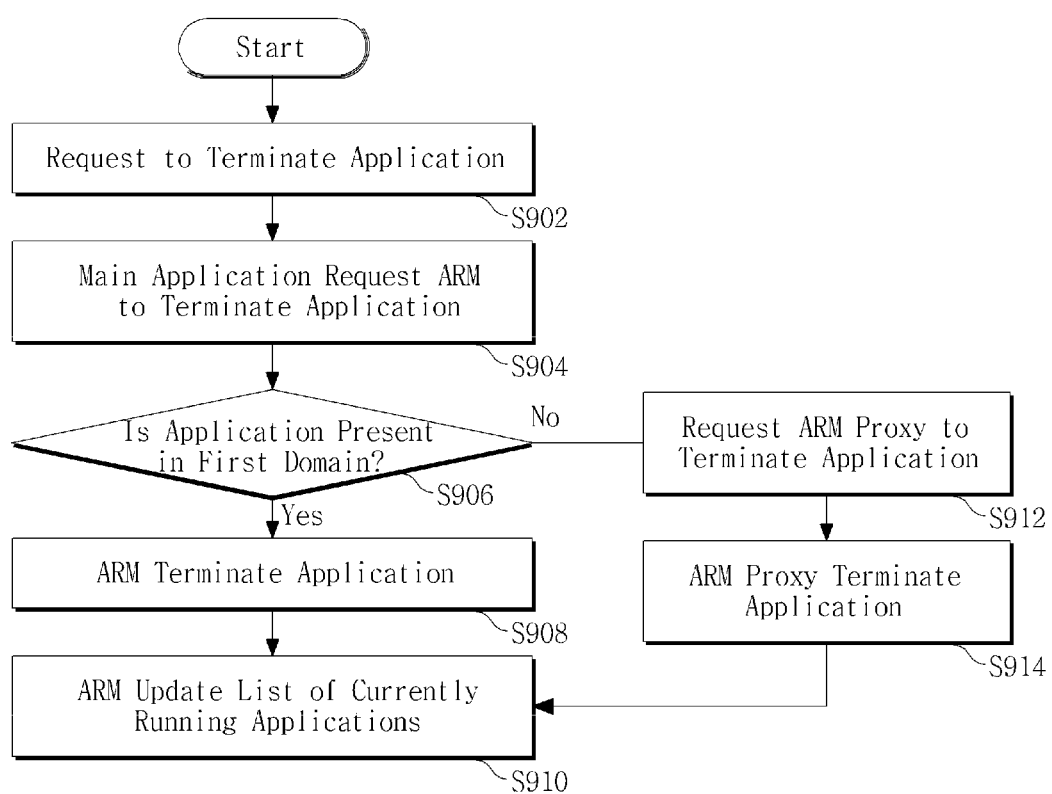
FIG. 9 is a flowchart illustrating an exemplary method of terminating an application in an apparatus for supporting a plurality of operating systems.

FIG. 9 illustrates termination of an application in an exemplary apparatus for supporting a plurality.

The user requests the termination of a predetermined application by a variety of methods (e.g., a system tool such as a main application or the MS window task manager) (operation S902). The request is transferred to the application runtime manager (ARM) (operation S904) and the application runtime manager checks if the application to be terminated belongs to a first domain in which the server operating system is operated.

Where the application belongs to the first domain, the application runtime manager directly terminates the application (operation S908). Where the application does not belong to the first domain, the application runtime manager requests an application runtime manager proxy of a domain to which the corresponding application belongs to terminate the application (operation S912). Then, the application runtime manager proxy terminates the application in response to the request (operation S914). Once the application is terminated, the application runtime manager updates a list of applications currently running (operation S910).

An integrated user interface for a variety of operating systems is provided by the exemplary apparatuses described above, thereby increasing convenience of use. For example, the integrated user interface may enable a user to run, manage, and terminate an application easily without learning in which operating system an application desired to run is present, or in which operating system the application is currently running. Furthermore, icons representing a plurality of applications on a plurality of operating systems are provided as an integrated user interface, and thus the exemplary methods described above may be effectively used for an apparatus with a small display.

The above-described methods may be recorded, stored, or fixed in one or more computer-readable media that includes program instructions to be implemented by a computer to cause a processor to execute or perform the program instructions. The media also may include, independently or in combination with the program, instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and/or methods described above, or vice versa.

The computer readable medium may also be distributed over network coupled computer systems so that the program instructions or a computer readable code may be stored and executed in a distributed fashion.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus comprising a single hardware that supports a plurality of operating systems, the plurality of operating systems comprising:
   a server operating system that runs on a virtual machine, and the server operating system is configured to run one or more applications and provide an integrated user interface for applications running on the plurality of operating systems; and
   at least one client operating system that runs on at least one other virtual machine, and the client operating system is configured to provide a user interface for one or more applications running on the client operating system through the integrated user interface of the server operating system,
   wherein the at least one client operating system and the server operating system are stored in the single hardware and communicate with each other via a kernel layer of the respective operating systems running on the respective virtual machines, and
   wherein in response to a user input signal to request installation of an application, an application registration manager of the server operating system selects a client operating system of the at least one client operating system in which the application is to be installed, installs the application in the selected operating system, and registers information including an installation path of the application in an application configuration manager.

2. The apparatus of claim 1, wherein the server operating system provides an integrated graphic user interface for the applications running on the server operating system and the at least one client operating system.

3. The apparatus of claim 2, wherein the server operating system provides icons representing individual applications in a window as a unified graphic user interface.

4. The apparatus of claim 2, in response to applications being present in a plurality of domains, the server operating system provides information indicating the domain in which each application is present, along with a corresponding application icon.

5. The apparatus of claim 1, wherein:
   the server operating system comprises the application configuration manager configured to store and manage information of applications running on the plurality of operating systems, the application registration manager configured to install the applications, an application runtime manager configured to control execution of the applications, and a human interface device (HID) manager configured to control a user interface device, and
   the client operating system comprises an application registration manager proxy configured to install applications on the client operating system under the control of the application registration manager of the server operating system, an application runtime manager proxy configured to control execution of applications on the client operating system under the control of the application runtime manager of the server operating system, and an HID manager proxy configured to relay applications on the HID manager and the client operating system by communicating with the HID manager.

6. The apparatus of claim 1, wherein the application registration manager installs an application which is authenticated in a specific operating system among the plurality of operating systems.

7. The apparatus of claim 5, in response to a user input signal to request running an application and the requested application is to be run on the client operating system, the application runtime manager of the server operating system requests the application runtime manager proxy to run the requested application, receives the result of running the application from the application runtime manager proxy, and provides the result to the user.

8. The apparatus of claim 5, in response to a user input signal to request change of a foreground application from a current running application to another application, the server operating system provides the user with a list of applications currently running on the server operating system and the client operating system and provides the user with the requested application to be executed as the foreground application.

9. The apparatus of claim 5, in response to a user input signal to request termination of an application,
when the requested application is running on the server operating system, the application runtime manager terminates the execution of the application; and
when the requested application is running on the client operating system, the application runtime manager requests an application runtime manager proxy of a domain to which the requested application belongs to terminate the application and the application runtime manager updates a list of currently running applications when the application is terminated.

10. The apparatus of claim 5, wherein the HID manager sets an application to output sound among applications running on the server operating system and the at least one client operating system.

11. The apparatus of claim 1, wherein the server operating system provides an integrated user interface for applications running on the plurality of operating systems based on an inter-domain communication.

12. A method of supporting a plurality of operating systems by a single hardware, the method comprising:
running one or more applications interface in a server operating system, the server operating system comprising an application configuration manager configured to store and manage information of applications running on the plurality of operating systems and an application runtime manager configured to control execution of the applications;
providing an integrated user interface in the server operating system, the server operating system running on a virtual machine, for applications to be executed in the plurality of operating systems;
providing a user interface in at least one client operating system, the at least one client operating system running on at least one other virtual machine, for one or more applications present in the at least one client operating system to be executed through the server operating system, and the at least one client operating system comprising an application runtime manager proxy configured to control execution of applications on the client operating system under the control of the application runtime manager of the server operating system; and
in response to a user input signal to request installation of an application, selecting, by an application registration manager of the server operating system, a client operating system of the at least one client operating system in which the application is to be installed, installing the application in the selected operating system, and registering information including an installation path of the application in the application configuration manager.

13. The method of claim 12, wherein the providing of the integrated user interface in the server operating system comprises providing an integrated graphic user interface for applications to be executed on the server operating system and the at least one client operating system.

14. The method of claim 13, wherein the providing of the integrated graphic user interface comprises providing icons representing the respective applications in one window as the integrated graphic user interface.

15. The method of claim 12, further comprising:
receiving by an application runtime manager a user input signal to request running of an application;
determining by an application configuration manager the requested application is to run on the client operating system;
requesting by the application runtime manager the client operating system to run the requested application; and
receiving by the application runtime manager a result of running the application from the client operating system and providing the result to the user.

16. The method of claim 12, further comprising:
receiving by a main application a user input signal to request changing of a current foreground application to another application;
providing by the server operating system a list of applications currently running on the server operating system and the client operating system; and
providing a user with an application requested to be run from the list as the foreground application.

17. The method of claim 12, wherein where a user input signal to request termination of an application is received, at least one of:
terminating the application by the server operating system when the requested application is running on the server operating system; and
requesting by the server operating system the client operating system to terminate the application when the requested application is running on the client operating system.

18. A non-transitory computer-readable storage medium storing a program configured to cause an apparatus for supporting a plurality of operating systems by a single hardware to:
run one or more applications interface in a server operating system, the server operating system comprising an application registration manager configured to install applications;
provide an integrated user interface in the server operating system, the server operating system running on a virtual machine, for applications to be executed in the plurality of operating systems;
provide a user interface in at least one client operating system, the at least one client operating system running on at least one other virtual machine, for one or more applications present in the at least one client operating system through the server operating system, and the at least one client operating system comprising an application registration manager proxy configured to install applications on the client operating system under the control of the application registration manager of the server operating system; and
in response to a user input signal to request installation of an application, select, by an application registration manager of the server operating system, a client operating system of the at least one client operating system in which the application is to be installed, install the application in the selected operating system, and register information including an installation path of the application in the application configuration manager.

19. The apparatus of claim 1, wherein the server operating system comprises a virtual window service server and the at least one client operating system comprises at least one virtual window service client.

20. The apparatus of claim 1, wherein the at least one client operating system and the server operating system communicate with each other over an inter-domain communication (IDC) protocol and/or a network protocol through the kernel layer of the respective operating systems.

21. An apparatus comprising a single hardware that supports a plurality of virtual machines, the apparatus comprising:
    a first virtual machine comprising a server operating system which runs thereon and which runs one or more applications and provides an integrated user interface for applications running on a plurality of operating systems; and
    a second virtual machine comprising a client operating system which runs thereon and which provides a user interface for one or more applications running on the client operating system through the integrated user interface of the server operating system,
    wherein in response to a user input signal to request installation of an application, an application registration manager of the server operating system selects the client operating system in which the application is to be installed, installs the application in the selected operating system, and registers information including an installation path of the application in the application configuration manager.

22. The apparatus of claim 21, wherein the server operating system and the client operating system communicate with each other via a kernel layer of the respective operating systems running on the respective first and second virtual machines.

* * * * *